United States Patent
Chalawsky

(10) Patent No.: US 9,324,094 B1
(45) Date of Patent: Apr. 26, 2016

(54) AD SKIP FEATURE FOR CHARACTERIZING ADVERTISEMENT EFFECTIVENESS

(71) Applicant: Google Inc., Mountain View, CA (US)

(72) Inventor: Matt Chalawsky, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 13/919,814

(22) Filed: Jun. 17, 2013

Related U.S. Application Data

(63) Continuation of application No. 12/764,878, filed on Apr. 21, 2010, now Pat. No. 8,468,056.

(51) Int. Cl.
*G06Q 30/00* (2012.01)
*G06Q 30/02* (2012.01)

(52) U.S. Cl.
CPC ........ *G06Q 30/0242* (2013.01); *G06Q 30/0243* (2013.01); *G06Q 30/0277* (2013.01)

(58) Field of Classification Search
CPC ... G06Q 30/00; G06Q 30/02; G06Q 30/0241; G06Q 30/0242; G06Q 30/0243
USPC .................................................. 705/1, 14.68
See application file for complete search history.

(56) References Cited

U.S. PATENT DOCUMENTS

| | | | |
|---|---|---|---|
| 7,797,720 B2 | 9/2010 | Gopalakrishnan et al. | |
| 7,984,466 B2 | 7/2011 | Eldering et al. | |
| 8,005,713 B1 | 8/2011 | Sanz-Pastor et al. | |
| 8,108,257 B2 | 1/2012 | Sengamedu | |
| 2002/0191950 A1 | 12/2002 | Wang | |
| 2006/0287912 A1* | 12/2006 | Raghuvamshi | 705/14 |
| 2008/0152300 A1 | 6/2008 | Knee et al. | |
| 2009/0254931 A1 | 10/2009 | Pizzurro et al. | |

OTHER PUBLICATIONS

Kens et al., "Skip, skip, skip to my video," Nov. 11, 2009, to be published by the USPTO, 2 pages.
Windows Media, Windows Media Services, 2007, published by Microsoft Corporation, 497 pages.

* cited by examiner

*Primary Examiner* — Bennett Sigmond
*Assistant Examiner* — Marilyn G Macasiano
(74) *Attorney, Agent, or Firm* — Foley & Lardner LLP; John D. Lanza

(57) ABSTRACT

Methods, systems, and apparatus, including computer programs encoded on a computer storage medium, for characterizing effectiveness of online advertisements inserted into media streams based at least in part on monitoring events indicative of an audience skipping ad streams inserted into the media streams. The methods and systems described in this specification enable tracking the number of impressions prior to detecting events indicative of interest or disinterest for ad streams inserted into a media stream.

21 Claims, 11 Drawing Sheets

| Variable | Value | Comments |
|---|---|---|
| Skippable | Yes or No | N/A |
| Skip Minimum | n (sec) | Alternatively, % of ad stream duration |
| Skip Frequency | k-per-(time interval) | Alternatively, k-per-stopset, etc. |
| Skip Effect | Return to interrupted media stream | Alternatively, replace skipped ad stream with another ad stream, etc. |

180 →
182 — Skippable
184 — Skip Minimum
186 — Skip Frequency
188 — Skip Effect

FIG. 1C

AD SKIP FEATURE FOR CHARACTERIZING ADVERTISEMENT EFFECTIVENESS

RELATED APPLICATIONS

This application is a continuation application of U.S. Ser. No. 12/764,878, filed on Apr. 21, 2010, which is incorporated herein in its entirety.

BACKGROUND

This specification relates to characterizing effectiveness of online advertisements inserted into media streams based at least in part on monitoring events indicative of an audience skipping ad streams inserted into the media streams.

In some instances, online advertisements are inserted into audio or video streams based on a schedule that is configured to provide maximum effectiveness for the advertised message. An ad stream is considered effective if listeners or viewers of the ad stream express interest in the product or service presented by the inserted ad stream. In general, online ads that are expected to generate the most interest from audience members should be scheduled for insertion in the media stream, to ensure the largest revenue for the ad publisher.

Multiple factors such as a geographic location and audience demographics of a publisher, time of day, season, and the like can influence the effectiveness of ad streams inserted by the publisher in available ad slots of the media stream. As such, in generating an ad insertion schedule that would optimize the effectiveness of the ad streams, the foregoing factors can be used to guide decisions about reserving and/or bidding for available ad slots.

SUMMARY

In addition to the factors that can influence the effectiveness of online ads enumerated above, providing the means to an online audience for interacting with an ad presentation may also determine the ad's effectiveness. For example, an audience member may follow up on interest generated by the ad's message. Further, the audience member may skip a remainder portion of the ad presentation due to disinterest in the ad's message delivered by an early portion of the ad presentation. The methods and systems described in this specification enable tracking the number of impressions prior to detecting events indicative of interest or disinterest for ads inserted into a media stream.

One aspect of the subject matter described in this specification can be implemented as a method executed by a computer system. The method includes switching from streaming a first media stream to a client computer to streaming a second media stream to the client computer. Further included in the method is determining whether an audience rejection indication relating to the second media stream is received from the client computer after a predetermined time interval has lapsed since switching from the first media stream to the second media stream. Based on a result of the determining, the computer system continues executing the method by selectively interrupting streaming of the second media stream prior to completion of the second media stream, then resuming the streaming of the first media stream to the client computer. Also as a result of determining the audience rejection indication, the computer system continues executing the method by updating an effectiveness profile of the second media stream, and scheduling future presentations of the second media stream based at least in part on the updated profile.

These and other implementations can include one or more of the following features. The first media stream can include an online radio audio stream and the second media stream can include an audio ad. Additionally, the first media stream can include a video stream and the second media stream can include a video ad. The audience rejection indication can include an instruction to skip the presentation of the second media stream and a duration of the presentation of the second media stream prior to receiving the rejection indication.

In some implementations, the method can further included instructing a media player on the client computer to present a skip-element associated with the streaming of the second media stream and configured to detect the indication relating to the audience rejection of the second media stream presentation. In some cases, the second media stream may include a call-to-action for the audience member associated with the client computer. In such cases, the method further includes instructing the media player on the client computer to present a companion-element of the second media stream during the streaming of the second media stream. The companion-element is configured to detect an indication relating to interest in the second media stream presentation, and is presented separately from the skip-element. Further, the skip-element presentation can include overlaying the skip-element on an instance of the media player. Furthermore, the skip-element presentation includes tethering the skip-element to an instance of the media player. A media player instance includes one of a full-size instance, a small-size instance or a minimized instance. Additionally, the skip-element presentation further may include rendering the tethered skip-element in a top presentation-layer above a set of presentation-layers corresponding respectively to a set of applications running during the presentation of the second media stream. The set of presentation-layers may be rendered between the top presentation-layer and a presentation layer of the media player. In some cases, the skip-element can be presented simultaneously when switching the second media stream and the presented skip-element can be activated for receiving the audience rejection indication after a predetermined time interval since switching the second media stream. In some other cases, the skip-element can be presented and activated for receiving the audience rejection indication after a predetermined time interval since switching the second media stream.

In some implementations, the predetermined time interval can be 10 seconds. In other implementations, the predetermined time interval includes a specified fraction of a total presentation time of the second media stream. The specified fraction of the total presentation time of the second media stream can be 20%. In some other implementations, the predetermined time interval can be a larger of 10 seconds or 20% of a total presentation time of the second media stream.

The method may further include establishing that a number of previous audience rejections of media streams switched for the first media stream is less than a predetermined number of rejections per a given time interval. Responsive to the establishing, the method includes instructing a media player on the client computer to present a skip-element associated with streaming the second media stream and configured to detect the indication relating to the audience rejection of the second media stream presentation. The given time interval includes one of one hour, one day-part or one day. Additionally, the given time interval can include a duration of one or more stopsets.

In some implementations when switching the second media stream is performed on behalf of a subscriber associated with the second media stream, the method further includes charging the subscriber a first price corresponding to a partial impression of the second media stream upon receiving the audience rejection indication. For example, the second media stream can be an ad stream and the subscriber associated with the ad stream can be an advertiser. In some cases, the first price corresponding to the partial impression of the second media stream can be equal to a predetermined price for a full impression of the second media stream. However, the predetermined price for the full impression of the second media stream may be $0, i.e., the publisher may not charge an advertiser for an ad impression. In other cases, the first price corresponding to the partial impression of the second media stream may be substantially $0, i.e., much less than a predetermined price for a full impression of the second media stream. In some other cases, the first price corresponding to the partial impression of the second media stream may be proportional with an impression time of the partial impression of the second media stream, and may be equal to a predetermined price for a full impression of the second media stream if the impression time equals a full impression time. In yet other cases, the first price corresponding to the partial impression of the second media stream may be slightly less than (or substantially the same as) a predetermined price for a full impression of the second media stream.

Additionally, the method further includes charging the subscriber a predetermined price for a full impression of the second media stream upon not receiving the audience rejection indication. The predetermined price is less than or equal to first price. Upon further detecting an indication relating to interest in the second media stream presentation, the method also includes charging the subscriber a second price higher than the predetermined price.

In some implementations, the method includes buffering a plurality of media streams including the second media stream. The buffered plurality of media streams may be used for switching from a currently streaming media stream to streaming another media stream to the client computer. Responsive to the received indication of the audience rejection of the presentation of the second media stream, and prior to resuming the streaming of the first media stream to the client computer, the method further includes selecting a third media stream from the buffered plurality of media streams. Such selecting may be based on a predetermined priority. Then, the computer system continues executing the method by switching from streaming the second media stream to streaming the selected third media stream to the client computer. Streaming of the first media stream may be resumed after the presentation of the third media stream. In some instances, a rejected media stream may be associated with a subscriber, and the predetermined priority may include replacing the rejected media stream with another media stream associated with the subscriber from the buffered plurality of media streams. The replacing, in these instances, can be based on a specification provided by the subscriber. In other instances, the rejected media stream may be again associated with the subscriber, and the predetermined priority may include replacing the rejected media stream with another media stream associated with another subscriber from the buffered plurality of media streams. The replacing, in these other instances, can be based on a specification provided by the other subscriber. In some other instances, the predetermined priority can include replacing a rejected media stream with another media stream from the buffered plurality of media streams based on a specification provided by the audience member associated with the client computer.

Responsive to the received indication of the audience rejection of the presentation of the second media stream, and prior to resuming the streaming of the first media stream to the client computer, the method further can further include conducting an auction for replacing the rejected second media stream. Then, the method continues with identifying a third media stream as a winner of the auction, followed by switching from streaming the second media stream to the client computer to streaming the identified third media stream to the client computer. Streaming the first media stream can be resumed after the presentation of the third media stream. Prior to said conducting the auction for replacing the rejected second media stream, the method may include filtering media streams participating in the auction. Filtering may be based on a given criterion.

Updating the profile includes aggregating information included in the received audience rejection indication with information relating to previous presentations of the second media stream by a plurality of publishers to an audience monitored by a hub computer system. Additionally, updating the profile can include aggregating information included in the received audience rejection indication with information relating to previous presentations of the second media stream by a publisher to an audience of the publisher monitored by a hub computer system.

Another aspect of the subject matter described in this specification can be implemented as a computer storage medium encoded with a computer program, the program including instructions that when executed by data processing apparatus cause the data processing apparatus to perform operations including switching from streaming a media stream to a client computer to streaming an ad stream to the client computer. The operations also include determining whether an audience rejection indication relating to the ad stream is received from the client computer after a predetermined time interval has lapsed since switching from the media stream to the ad stream. Based on a result of the determining, the data processing apparatus can perform operations including selectively interrupting streaming of the ad stream prior to completion of the ad stream and resuming streaming of the media stream to the client computer. Also based on the result of determining the audience rejection indication, the data processing apparatus can perform operations including updating a profile of an audience member associated with the client computer. The profile represents a presentation effectiveness of ad streams to the audience member. Further operations include scheduling future ad stream presentations to the audience member based at least in part on the updated profile.

Yet another aspect of the subject matter described in this specification can be implemented as a system including a user device to play streaming media and a plurality of storage devices to store the streaming media. The system further includes one or more computer systems operable to interact with the user device and with the plurality of storage device. The one or more computer systems are configured to switch from streaming a media stream to the user device to streaming an ad stream to the user device. Further, the one or more computer systems are configured to determine whether an audience rejection indication relating to the ad stream is received from the user device after a predetermined time interval has lapsed since switching from the media stream to the ad stream. The one or more computer systems are configured to selectively interrupt streaming of the ad stream prior to completion of the ad stream and to resume streaming of the media stream to the user device, based on a result of the determination. In addition, the one or more computer systems are configured to update an effectiveness profile of the ad stream, also based on the result of the audience rejection indication determination. Further, the one or more computer systems are configured to schedule future presentations of the ad stream based at least in part on the updated ad stream profile. Additionally, the one or more computer systems are configured to update a profile of an audience member associated with the user device, also based on the result of the audience rejection indication determination. The audience member profile represents a presentation effectiveness of ad streams to the audience member. Furthermore, the one or more computer systems are configured to schedule future ad stream presentations to the audience member based at least in part on the updated audience member profile.

These and other implementations can include one or more of the following features. In some implementations, the one or more computer systems may include a publishing server system and a hub computer system operable to interact with the user device through a data communication network. The user device may be operable to interact with the publishing server system and with the hub computer system as a client. The publishing server system can be configured to stream the media stream to the user device. The hub computer system can be configured to stream the ad stream to the user device, to update the ad stream profile, and to schedule future presentations of the ad stream. Additionally, the hub computer system can be configured to update the audience member profile, and to schedule future ad stream presentations for the audience member.

In other implementations, the one or more computer systems may include a publishing server system operable to interact with the user device through a data communication network, and the user device may be operable to interact with the publishing server system as a client. In some other implementations, the user device may be a mobile telephone, and a storage device among the plurality of storage devices that can be local to the mobile telephone may be configured to store ad streams according to a profile of the audience member associated with the mobile telephone.

Particular implementations of the subject matter described in this specification can be implemented so as to realize one or more of the following potential advantages. Operators of an Internet-based provider of advertising service may provide an audience of streaming media with a mechanism through which an audience member can play a portion of an ad stream to determine whether the ad message is of interest to them. Based on this determination, audience members may have an incentive to avoid simply skipping all the inserted ad streams, and instead they may skip only ad streams that are of no interest to them. This may improve the audience's media streaming experience.

Further, the disclosed systems and techniques can enable the operators of the Internet-based provider of advertising services to provide publishers with means to improve the audience's experience while maximizing the publishers' revenue. For example, the publishers may have opportunities to insert additional ad streams upon detecting skip events by an audience member. In some implementations, the publishers may indicate whether the ad streams to be inserted into the media stream are skippable and may establish a maximum skipping rate for the ad streams played during the media stream.

Furthermore, the systems and techniques disclosed in this specification can be used to measure an effectiveness of the ad stream presentation. The measured effectiveness can be recorded as part of the ad stream's profile and/or can be applied to improve targeting of the ad stream. Data collected as part of the disclosed processes can be parsed to establish audience skipping patterns and topics/subjects that are of no interest to an audience. Also, the audience's overall interest in the message delivered by a skippable ad stream can be extracted from collected data related to skipping the ad as well as from collected data related to audience members clicking on a companion element of the ad stream in response to a call to action delivered as part of the ad message.

To protect an audience's and/or user's privacy, the foregoing data can be collected upon audience/user consent to participate in data collection activities for generating, e.g., audience/user interest/disinterest patterns. In some implementations, an audience member or user can be prompted to explicitly allow data collection by, e.g., personally logging-in to a specific account, or the like. Further, the audience/user may opt in/out of participating in such data collection activities. Furthermore, the collected data can be anonymized prior to performing the analysis to obtain the various statistical patterns described above. In addition, publishers collecting such audience data may give potential advertisers access to anonymized profiles of audience members/users or to aggregate statistics about the interest/disinterest of anonymous audiences/users.

To increase the accuracy of the collected data, the skipping mechanism of the ad stream may be provided separately from a clickable companion element of the ad stream. Such separation can potentially reduce a number of inadvertent clicks on the companion element by audience members who may have intended to skip the ad stream and who may not have intended to follow up on the message delivered by the ad stream.

Click-through-rates (CTRs) for an ad stream may be small, for example less than 1%, indicating that most people may not be interested in the ad stream. Consequently, such an ad stream may be skipped by most of the audience, thus reducing the amount of play time for this ad stream. Consequently, other ad streams may be played in place of the skipped ad stream(s) resulting in increased revenue for the operators of the Internet-based provider of advertising service and for the publishers. In addition, the ad streams that are being played fully (that are not being skipped by the audience members) would potentially have a higher CTR.

Additionally, by implementing the systems and techniques described in this specification, the operators of the Internet-based provider of advertising services may provide advertisers with data related to skipping or not skipping by the ad stream audience. Analysis of the provided data can guide the advertisers to create more effective ads that can maximize advertisers' revenue through minimizing the number of ad stream impressions. For example, the advertisers may find out how many audience members skipped their ad stream and at what point in the ad.

The advertisers can also benefit from an effectiveness feedback for cost-per-impression ads (CPM-ads) that is established based on the disclosed techniques. For instance, the operators of the Internet-based provider of advertising services can price skippable ad streams such that advertisers may also benefit by paying a lower cost for ad streams that have been skipped. In addition, skippable ad streams may be allowed/accepted by publishers to compete against shorter ad streams in an auction. For example, many publishers only allow 10 second ads, but by adding the disclosed skip ad feature these publishers may insert longer ad streams (e.g., of 30 second duration), giving the advertisers access to more unsold ad slot inventory. Further, the longer skippable ad streams may enable the advertisers to get their complete/detailed message played.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1C shows a table containing example variables for presenting skippable ad streams by the example system.

Like reference numbers and designations in the various drawings indicate like elements.

DETAILED DESCRIPTION

Figure 1A:
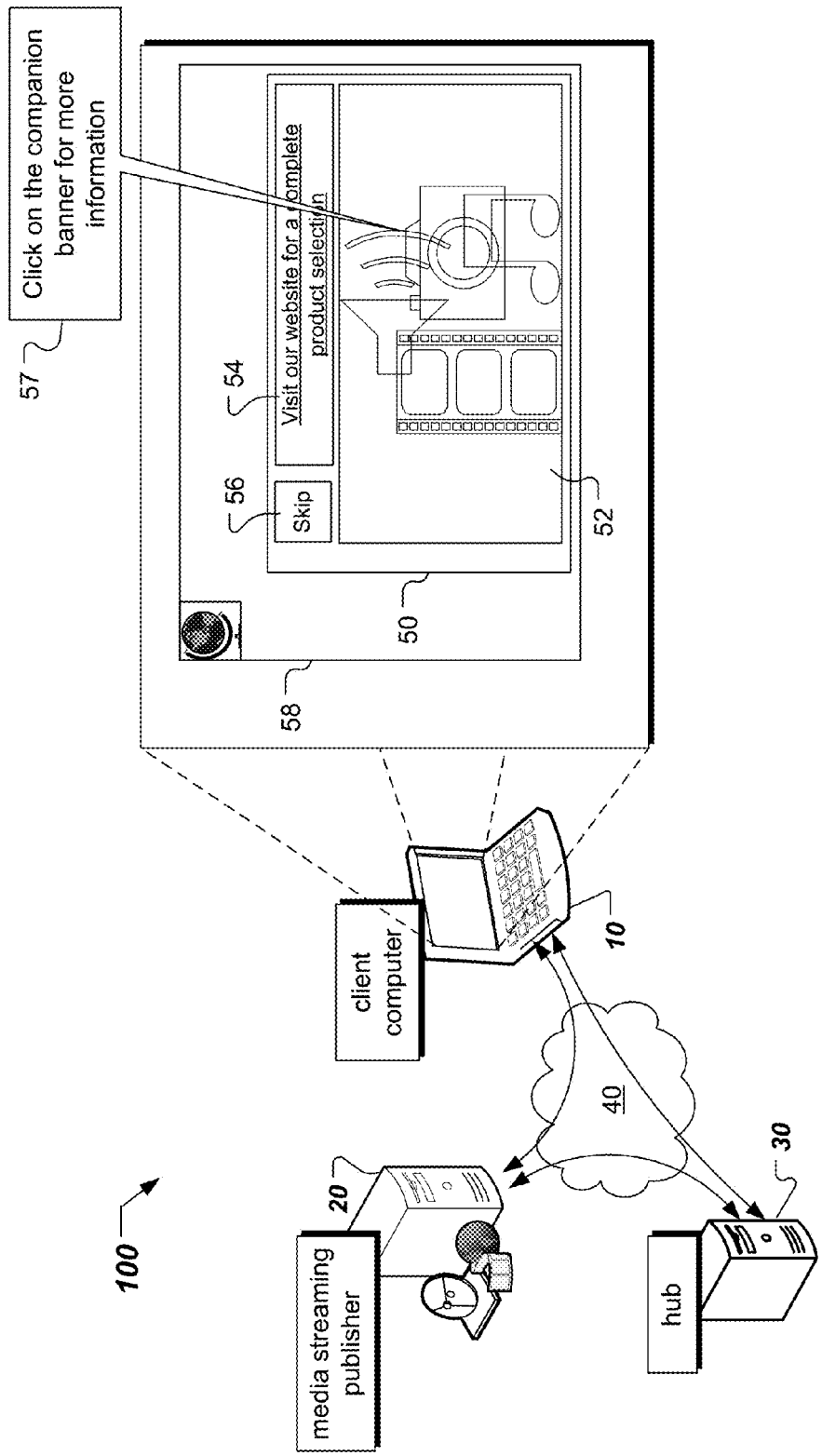
FIGS. 1A and 1B show conceptual diagrams of an example system for presenting advertisement streams.

An advertiser can design an advertising campaign to deliver a message about a new and exciting product to a targeted audience. The advertiser may target, for example, listeners of online radio or viewers of online TV. To effectively reach its targeted online audience, the advertiser may choose to deliver the advertising message to an audience member via an internet-based provider of advertising services that can select, on behalf of the advertiser, a media streaming publisher to present the advertiser's ad campaigns.

Providing means to an online audience for interacting with an ad presentation (e.g., for expressing interest or disinterest in the ad presentation) may influence the ad's effectiveness. For example, an audience member may use a companion-element (e.g., a clickable banner) presented during a presentation of the ad stream to follow up on interest generated by the ad's message. Further, the audience member may use a skip-element (e.g., a skip button) presented during a presentation of the ad stream to skip a remainder portion of the ad presentation due to disinterest in the ad's message delivered by an early portion of the ad presentation. The methods and systems described in this specification enable tracking the number of impressions prior to recording corresponding events indicative of interest or disinterest for ads inserted into a media stream.

In some implementations, a listener of an online audio stream may be able to choose whether to listen to an audio ad stream that is inserted into an ad slot of the online audio stream. If the listener chooses to skip the ad stream, the online audio stream can resume without delay. Skippable ad streams have the potential to create a favorable outcome for everyone involved with online audio streaming. For listeners, this ad stream format gives the listeners control over their experience. For advertisers, such skippable ad streams may offer a payment model where advertisers pay for ads that listeners actually listen and engage with. For publishers, skippable ad streams can decrease abandonment rates, helping the publishers protect the listenership they've worked hard to generate. For example, advertisers are often willing to pay more money for an engaged opt-in play, as opposed to a forced play like inserting a non-skippable ad stream in the online audio stream, so this also has the potential to increase a cost-per-impression (CPM) of online ad inventory.

In general, an ad stream can be an audio ad or a video ad, and can be inserted into an available ad slot of a media stream. The available ad slot can be an unsold ad slot or a previously scheduled preemptable ad stream. An ad stream including an ad skip feature is interchangeably referred to as a skippable ad stream. The ad skip feature of an ad stream includes an indication provided by a publisher that the ad stream is skippable. An Internet-based provider of advertising services or a publisher system can provide skippable ad streams to an audience by activating a skip button at the beginning of ad stream plays. An audience member can skip the ad stream after playing a fraction of the ad stream, for instance. When the audience member skips the ad stream, the publisher can resume streaming the media stream content or can insert another ad stream.

A skippable ad stream can contain a grabber portion and a full story portion. The grabber portion of an ad stream can be a short segment, e.g. 7 seconds, of the ad stream that cannot be skipped. This is the time when a content of the ad stream (e.g., a message delivered by the ad stream) may grab the audience's interest. The full story portion of the ad stream includes the remainder portion of the ad stream, beyond the grabber portion. The advertiser can assume that the audience members still playing the full story portion of the ad stream have some interest in the advertised product. In this fashion, by using skippable ad streams advertisers can potentially have more time to present detailed advertising messages than by using short ad streams without the ad skip feature. Additionally, a publisher that only allows 10 second-ads may allow 30 second-ads that are skippable after the initial 7 seconds.

FIG. 1A shows a conceptual diagram of an example system 100 for presenting advertisement streams.

An audience member can use a client computer 10 to run a media player 50 for playing online media content that is streamed via the Internet 40 from a media publisher associated with a media streaming server computer 20. The media player 50 can include a viewer panel 52 and an additional panel 54 for presenting a companion-element of an ad stream that is being played in the viewer panel 52. For example, the companion-element may be a banner displayed in a banner-panel 54. Additionally, the media player may be configured to display a skip-element 56 for receiving, from an audience member associated with the client computer 10, an instruction to skip the presentation of the currently playing ad stream.

The media streaming server computer 20 is configured to stream media streams requested by the client computer 10. A multitude of media can be streamed over internet-based communication links, such as text, pictures, music, video, live TV and multimedia. For example, the publishing content may be radio content, such as music, or sports, and the publishers 20 may be internet-radio stations. Radio content can be presented by an internet-radio station via internet streaming in a broadcast manner (the same radio content is presented simultaneously to many audience members 10) or in a personalized manner (different radio content is sent to each audience member according to an audience member's preferences). In some implementations, presenting audio ads by the internet-radio stations 20 can be achieved using equipment configured to stream the audio content of the ad accompanied by text and or images. In other implementations, presenting the audio ads by the internet-radio stations 20 can require equipment further configured to stream video content. Furthermore, in one aspect, the audio ads can be presented in a streaming broadcast manner, i.e., all listeners 10 of the internet-radio station may receive the same ad stream at a particular time. In another aspect, each listener of the internet-radio station may receive personalized ads based on, for example, a listener's profile.

In another example, the publishing content may be live TV content, such as shows or live sports events, and the publishers 20 may be internet-TV stations. In some implementations, presenting ads by the internet-TV stations 20 can be achieved using equipment configured to stream the audio and video content of the ad. Furthermore, in one aspect, the ads can be presented in a streaming broadcast manner, i.e., all viewers 10 of the internet-TV station may receive the same ad stream at a particular time. In another aspect, each viewer of the internet-TV station may receive personalized ads based on, for example, a viewer's profile.

A hub computer system 30 associated with the internet-based provider of advertising services can be communicatively coupled via the Internet 40 with the publisher computer system 20 and with the client computer 10. In some implementations of system 100, the hub computer system 30 is configured to instruct the publisher computer system 20 to insert ad streams for presentation to the client computer 10 during respective advertising slots of the media streams. Radio or TV ad streams presented to the client computer 10 are disruptive in nature, i.e., the underlying programming, show, movie, is interrupted by the presentation of the ad stream. In contrast, an advertisement that is not disruptive can be ignored by the listener or viewer. An example of a non-disruptive ad is a banner presented while the audio or video is streamed to the player. The audience member can choose to ignore the presented banner.

Media players 50 can be instructed to present a companion-element 54 along with the content of the ad stream 52. Instructions to stream certain ad streams can be received from the publisher computer server 20, while the instructions to stream some other ad streams may be received from the hub computer system 30. The companion-element 54 can be clicked by audience members interested in following up on information provided during the ad stream presentation. The ad stream presented to the client computer 10 can also include a call-to-action 57 for prompting the audience member to click on the companion-element 54 of the ad stream to obtain additional information about a product or service described in the ad stream. Additionally, the call-to-action 57 can be a prompt for the audience member to acquire the product described in the ad stream. To follow up for additional information or to purchase the advertised product the audience member can access, e.g., the advertiser's web site either in a browser included in the media player 50 or in another browser 58 running on the client computer 10.

In addition, media players 50 can be instructed to present the skip-element 56 along with the content of ad stream 52. The instruction to present the skip-element 56 can be provided by the media streaming publisher server 20 or by the hub computer system 30. The skip-element 56 is associated with streaming the ad stream and is configured to detect an indication relating to the rejection of the ad stream presentation. For example, the skip-element 56 can be implemented as a button to be clicked by audience members who may be disinterested in an advertising message presented by the ad stream. Other implementations of the skip-element are disclosed in connection with FIG. 5. Further, the media player 50 is configured to present the companion-element 54 separately from the skip-element 56. The separation of the companion-element 54 from the skip-element 56 can potentially prevent inadvertent clicks on the companion-element 54 by audience members who may have intended to skip the ad stream.

Figure 1B:
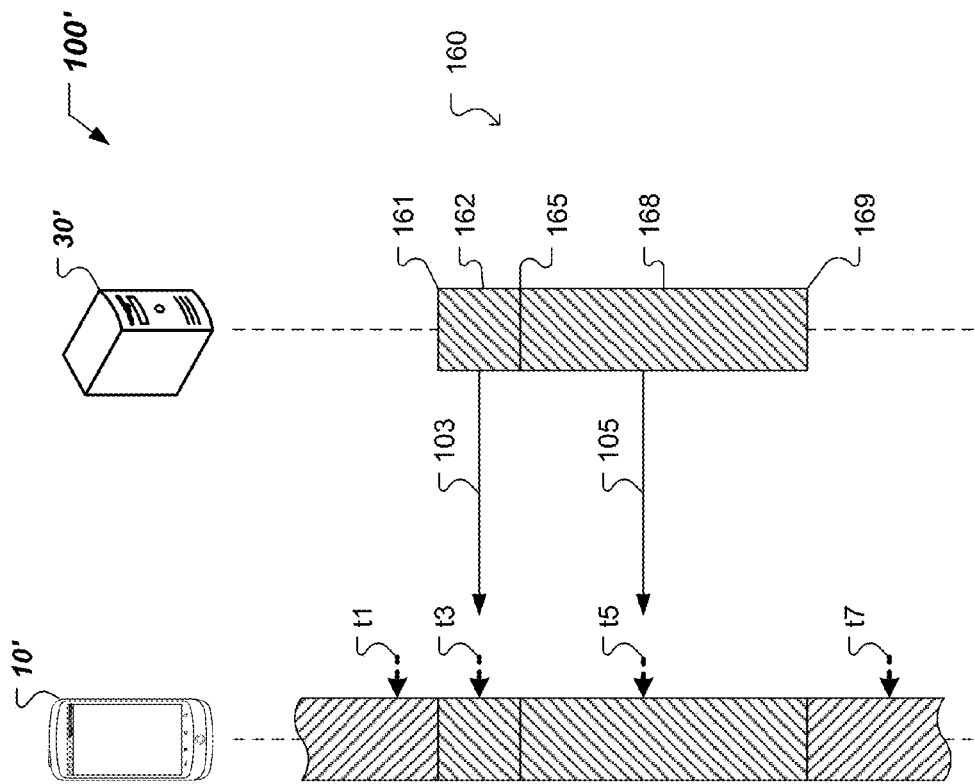
Figure 1B:
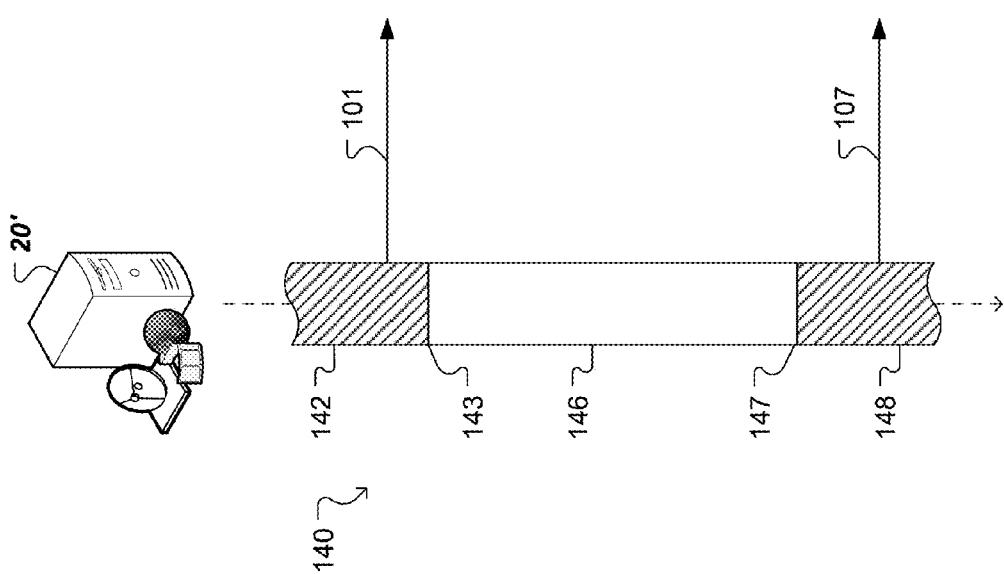

FIG. 1B is a swim-lane diagram that shows a time sequence of processes for presenting advertisement streams implemented in system 100'. The time sequence includes time t1 (at the top of the swim-lane diagram), time t7 (at the bottom of the swim-lane diagram), and intermediate times in-between. System 100' illustrated schematically in FIG. 1B can correspond to system 100 described in FIG. 1A. For example, the representations of user device 10', media streaming server computer 20' and hub computer system 30' in FIG. 1B can correspond, respectively, to client computer 10, media streaming server computer 20, and hub computer system 30 of system 100 described in FIG. 1A. Additionally, the media streaming server computer 20' can be communicatively coupled with storage devices configured to store media streaming files, while the hub computer system 30' can be communicatively coupled with other storage devices configured to store ad streaming files.

In the example implementation of system 100', the user device 10' is operable by an audience member to interact with the publishing server system 20' and with the hub computer system 30' as a client. The publishing server system 20' is configured to stream 101, 107 a media stream 140 to the user device 10'. The hub computer system 30' is configured to stream 103, 105 an ad stream 160 to the user device 10'.

For example at time t1, media streaming server computer 20' streams 101 a portion 142 of the media stream 140 to a client computer 10'. End 143 of portion 142 of media stream 140 coincides with the beginning 143 of ad slot 146 of media stream 140.

The time to switch between the media stream 140 and the ad stream 160 coincides with the ending time 143 of the portion 142 of media stream 140 and with the starting time 161 of the ad stream 160. The hub computer system 30' is configured to stream ad stream 160 to the user device 10' for the duration of the ad slot 146. Later, the time to switch back between the ad stream 160 and the media stream 140 coincides with the ending time 169 of the ad stream 160 and with the starting time 147 of portion 148 of the media stream 140.

The ad stream 160 contains a first portion 162 referred to as the "grabber" portion, and a second portion 168 referred to as the "full story" portion. The grabber portion 162 of an ad stream 160 can be a short stream segment, e.g. 7-10 seconds, of the ad stream that cannot be skipped. This is the time when a content of the ad stream 160 (e.g., a message delivered by the ad stream) may grab the audience's interest. The full story portion 168 of the ad stream 160 includes the remainder portion of the ad stream 160, beyond the grabber portion 162.

The skip-element 56 may be presented in association with the media player 50 while streaming 103 the grabber portion 162 of the ad stream 160, for instance at time t3. In some implementations, presentation of the skip-element 56 can start when switching 142/161 the media stream 140 for the ad stream 160. However, the skip-element 56 can be activated after a predetermined time interval since switching 142/161 the media stream 140 for the ad stream 160. The predetermined time interval defines the end 165 of the grabber portion 162. Alternatively, presentation of the skip-element 56 can start at the end 165 of the grabber portion 162 and simultaneously the skip-element 56 can be activated.

The predetermined time interval can be 10 seconds. Alternatively, the predetermined time interval can be a specified fraction of a total presentation time of the ad stream 160. Further, the specified fraction of the total presentation time of the ad stream 160 can be 20%. Furthermore, the predetermined time interval can be a larger of 10 seconds or 20% of a total presentation time of the second media stream 160. Skippable ad streams 160 are intended to grab the audience's attention from the beginning, i.e., while playing the grabber portion 162 of the ad stream 160. Therefore, advertisers may focus on delivering an effective message during the grabber portion 162 when creating skippable ad streams 160.

Finally, a skip-element 56 that is configured to receive an audience member's instruction to skip the presentation of the ad stream 160 can be presented in association of the media player 50 while streaming 105 the full-story portion 168 of the ad stream 160, for example at time t5. To further provide a consistent audience experience and accurate reporting of information collected by the disclosed systems 100, 100', ad streams 160 inserted in available ad slots 146 of media streams 140 may have a predetermined grabber portion 162 that is the same regardless of ad stream durations (10 s, 15 s, 30 s, 60 s) or ad stream provenance (i.e., ad streams generated in-house by the publisher 20', or provided by the Internet-based provider of advertising service 30'.

A first example category of publishers 20, 20' that can implement the techniques and systems 100, 100' disclosed in this specification may allow flexibility of the ad stream duration. Such publishers may stream media content based on play lists. The publishers 20, 20' of this first example category generally present short ad streams 160 (e.g. 10 s). An ad skip feature 162/168/56 of ad streams 160 may potentially enable advertisers to play longer ad streams 160 on this type of publishers 20, 20'. For example, a 30 s-ad stream 160 may be skippable after 5-10 s, so uninterested audience members 10, 10' can still effectively play the equivalent of short ad streams 160.

A second example category of publishers 20, 20' that can implement the disclosed systems 100, 100' and techniques are publishers 20, 20' with fixed length stopsets 146. Such stopsets 146 tend to be 1 to 4 minutes long. An ad stream 160 including the disclosed skip feature 162/168/56 may potentially be inserted into the second example stopsets 146. In some implementations, publishers 20, 20' of the second example category may fill the remaining stopset time with a subsequent portion 148 of the originally played media stream 140 (which was interrupted by the stopset 146.) Additionally or alternatively, the remaining stopset time can be filled with content selected by the audience member from a list of syndicated partners. Additionally or alternatively, the remaining stopset time can be managed using a caching strategy. The operators of the Internet-based provider of advertising service 30 can buffer additional skippable ad streams 160 and can insert the buffered ads upon detecting ad skip events during stopsets 146.

In some implementations, the publishing server system 20' is configured to stream 101, 107 a media stream 140 to the user device 10', and to also stream 103, 105 an ad stream 160 to the user device 10', while the user device 10' is operable to interact with the publishing server system 20' as a client. In some implementations, the user device 10' can be a mobile telephone. A storage device can be local to the mobile telephone and may be configured to store ad streams 160 according to a profile of the audience member associated with the mobile telephone.

FIG. 1C shows a table 180 containing example variables for presenting skippable ad streams 160 by the example systems 100 and 100'. These variables can be used by publishers 20, 20' or by Internet-based providers of advertising services 30, 30' for implementing the techniques and systems 100, 100' disclosed in this specification.

For example, a variable called "Skippable" 180 can denote whether an ad stream 160 is skippable or not. Publishers 20, 20' and advertisers, can identify an ad stream 160 as skippable. If not all ad streams 160 played by a publisher 20, 20' are skippable, listeners 10, 10' of audio ad streams 160 may not know which one is skippable, and since the media player 50 may be minimized while playing an ad stream 160, the listeners 10, 10' may have to restore the media player 50 to find out if an ad stream 160 displays a skip-button 56. To avoid such situations, ad streams 160 produced by the publishers 20, 20' may also be skippable in a similar manner as the ad streams 160 provided by the Internet-based provider of advertising service 30, 30'. To generate ad streams 160 that have a consistent look and feel with respect to the ad skipping-element 56, an API can be provided to the publishers 20, 20' that includes a skip-element 56 (e.g., button) in the software development kit (SDK). Various implementations of the skip-element 56 are described below in connection with FIG. 5.

A variable called "Skip Minimum" 184 represents the minimum duration 165 that the ad stream 160 is to be played prior to activating the skip-element 56. The Skip Minimum variable 184 sets the length of the "grabber" portion 162 of the ad stream 160. The Skip Minimum variable 184 can be specified as a duration (in seconds) or a fraction (in percentage) of the ad stream 160 (e.g. 25%). The Skip Minimum variable 184 is intended to ensure that the audience members play enough of the ad stream for the ad message to potentially grab their interest. In some instances, 25% may work well for 30 s and 60 s ads, but may not provide enough time to grab the audience's attention for 10 s and 15 s ads. The Skip Minimum variable 184 can vary based on the duration of the ad stream, but there may also be a Skip Minimum value that is applicable to all ad streams played by a particular publisher.

A user interface presented to advertisers for creating ad campaigns and for uploading ad streams that are part of the created ad campaign may include an indicator to specify whether the uploaded ad streams 160 are skippable (as indicated by the value Yes/No of the Skippable variable 182). Another indicator may specify a duration or a fraction of the ad stream total duration at which the ad stream 160 can be skipped (as indicated by the value in seconds or in % of the Skip Minimum variable 184).

Additionally, an API provided to a publisher 20, 20' to request filling the available ad spot inventory may indicate that the requesting publisher 20, 20' allows/accepts or requires skippable ad streams 160 (as indicated by the value Yes/No of the Skippable variable 182). The publishers 20, 20' may also indicate the max duration 165 before activating the skippable-element 56 presented in association with an ad stream 160 (as indicated by the value in seconds or in % of the Skip Minimum variable 184).

A variable called "Skip Frequency" 186 specifies how often an audience member 10, 10' is allowed to skip ad streams 160 over a given time interval (e.g. 3 ad streams per hour). The Skip Frequency 186 variable can be set by the publisher 20, 20' or by the operators of the Internet-based provider of advertising services 30, 30'. Yet another aspect that may contribute to providing a consistent audience experience and accurate reporting of information collected by the disclosed systems 100, 100' may be limiting the number of skips allowed per hour or per stopset, to avoid cases when an audience member 10, 10' blindly skips all played ad streams 160. Such a limitation may provide incentives for the audience members 10, 10' to use the ad skip-element 56 specifically for ad streams that are of no interest to the audience members 10, 10', rather than to indiscriminately skip all played ad streams 160.

Thus, the disclosed techniques also include determining that a number of previous rejections of ad streams 160 switched into the media stream 140 is less than a predetermined number of rejections per a given time interval. Responsive to such determination, the hub computer system 30' can instruct the media player 50 on the user device 10' to present a skip-element 56 associated with streaming 105 the ad stream 160 and configured to detect an indication relating to the rejection of the ad stream 160 presentation. The given time interval can be one of one hour, one day-part or one day. The given time interval can also be a duration of one or more stopsets 146.

A variable called "Skip Effect" 188 indicates what happens when an audience member 10, 10' skips an ad stream 160: For example, the skipped ad stream 160 may be replaced by another inserted ad stream 160', or the streaming 107 of the interrupted media stream 140 can be resumed from a subsequent portion 148. The options represented by the Skip Effect variable 188 can be established by the publisher 20, 20', for instance.

Figure 2A:
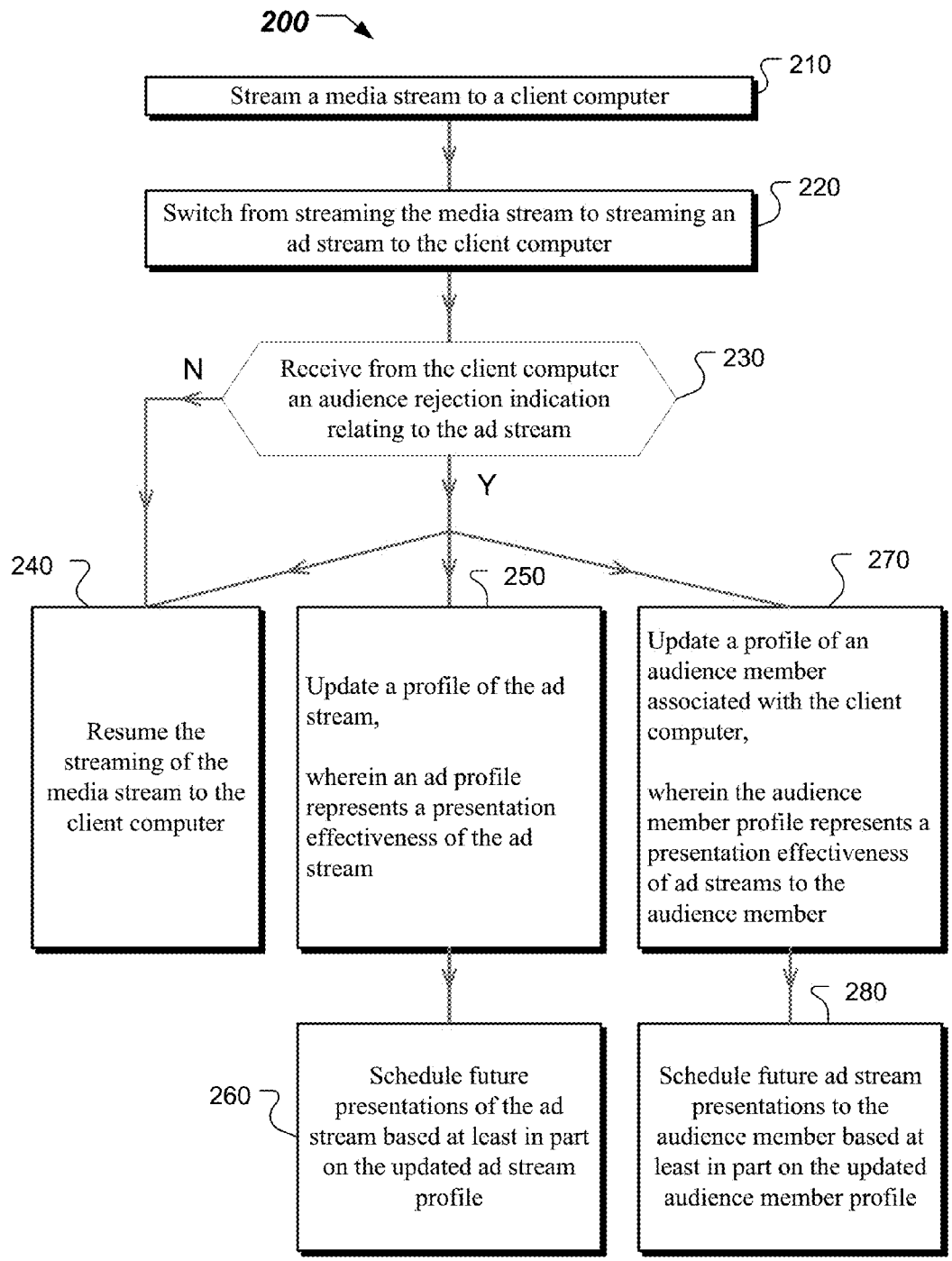
FIG. 2A shows a flow chart of an example process for presenting skippable ad streams to an audience member.

FIG. 2A shows a flow chart of an example process 200 for presenting skippable ad streams to an audience member. Process 200 can be implemented on one or more computer systems 20, 30 of system 100 and/or on one or more computer systems 20', 30' of system 100'. The one or more computer systems can be configured to stream 210 a media stream to a user device, then to switch 220 from streaming the media stream to streaming an ad stream to the user device. The one or more computer systems can determine whether an audience rejection indication relating to the ad stream is received 230 from the client computer during the streaming of the ad stream. If the result of the determination is negative, the streaming of the media stream can be resumed 240 after a presentation of the ad stream.

Upon streaming the ad stream for a time interval equal to or longer than a predetermined time interval since the switching 220, the one or more computer systems can determine that an indication relating to a rejection of a presentation of the ad stream by an audience member associated with the user device was received 230 from the user device. Responsive to receiving 230 the rejection indication, the one or more computer systems can resume 240 the streaming of the media stream to the user device.

Further responsive to receiving 230 the rejection indication, a profile of the ad stream can be updated 250 by the one or more computer systems. The ad stream profile represents a presentation effectiveness of the ad stream. The one or more computer systems are further configured to schedule 260 future presentations of the ad stream based at least in part on the updated ad stream profile.

Furthermore responsive to receiving the rejection indication, a profile of the audience member can be updated 270 by the one or more computer systems. The audience member profile represents a presentation effectiveness of ad streams to the audience member. The one or more computer systems are further configured to schedule 280 future ad stream presentations for the audience member based at least in part on the updated audience member profile.

In some implementations, the hub computer system 30, 30' can be further configured to track impressions of the ad stream 160, indications of disinterest in the ad stream 160 (i.e., detection of skip events via the skip-element 56 presented to an audience of the tracked impressions), and indications of interest in the ad stream 160 (i.e., detection of clicking on a banner 54 or purchasing the product from a web site 58 by the audience of the tracked impressions.) The information collected in this manner can be then used by the Internet-based providers of advertising services 30, 30' for optimizing schedule and delivery of advertisement streams 160. For example, the publishers 20, 20' and/or the advertisers can learn based on the collected information what fraction of an audience of an ad stream 160 has used the skip-element 56 to reject presentations of the ad stream 160, and what fraction of ad stream presentations has been skipped by a particular audience member 10, 10'. Also based on the collected information, the publishers 20, 20' and/or the advertisers can gain insight into the number of times an audience member 10, 10' listens to or views an ad stream 160 before the audience member clicks on the companion-element 54 of the ad stream 160.

Figure 2B:
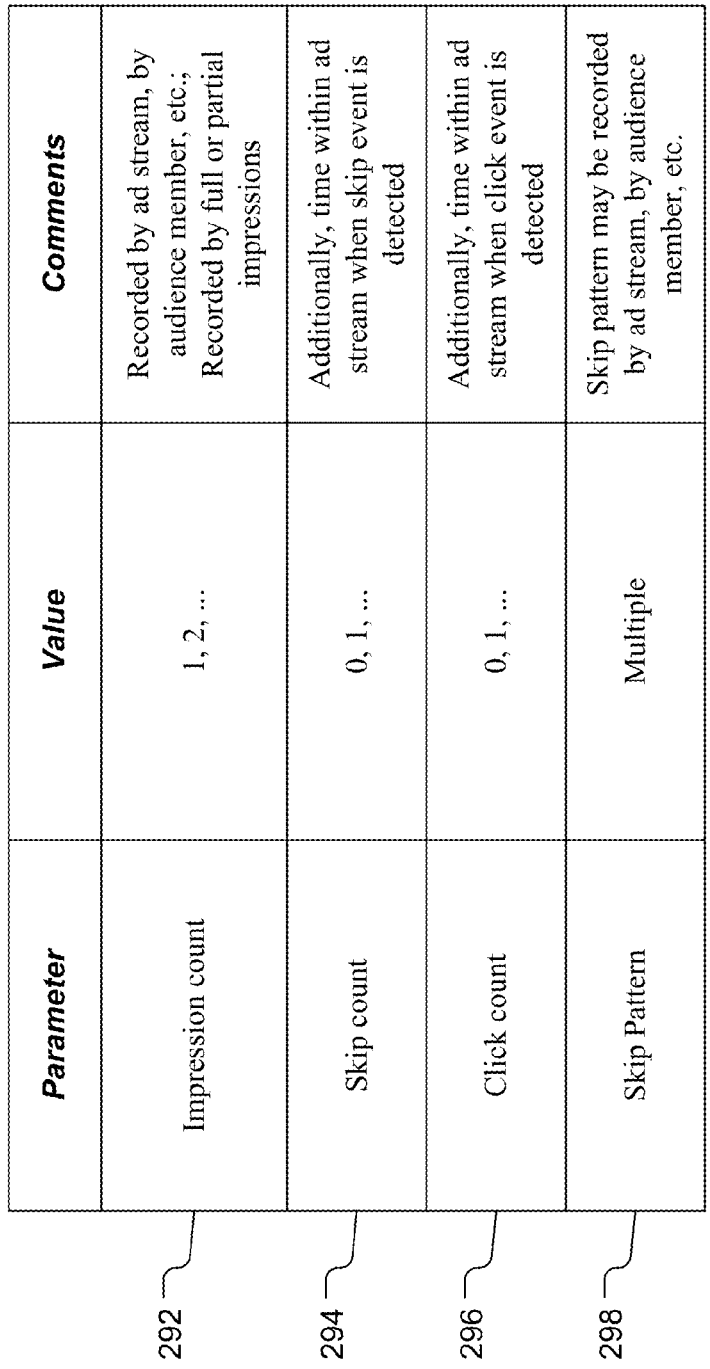
FIG. 2B shows a table containing example feedback information collected by the example system for presenting ad streams to a targeted audience.

FIG. 2B shows a table 290 containing example feedback information collected by the example systems 100, 100' for presenting ad streams to a targeted audience. The one or more computer systems 20, 30 of system 100 and/or the one or more computer systems 20', 30' of system 100' are configured to monitor several of the parameters listed in table 290.

An "Impression Count" parameter 292 records a number of presentations of ad streams. Values of the Impression Count parameter can be 1, 2, . . . . The impressions can be counted for each ad stream 160 over an entire monitored audience. The impressions for each ad stream 160 can be grouped by sets of audience members (e.g., impressions to listeners of online radio station K, of online radio station L, etc.), by audience members (e.g., impressions to Mr. X, to Ms. Y, etc.), by geography, and by many other grouping criteria. Alternatively, impressions of monitored ad streams can be counted for each audience member 10, 10' having experienced the impressions of the monitored ad streams. The impressions for each audience member can be grouped by sets of ad streams (e.g., impressions targeting product type A, product type B, etc.), by advertiser (e.g., impressions promoting brand M, brand N, etc.), and by many other grouping criteria.

A "Skip Count" parameter 294 records a number of skip events detected by the systems 100, 100' via a skip-element 56. The skip events correspond to detections of rejection indications. Values of the Skip Count parameter 294 can be 0, 1, . . . (smaller than or equal to the value of the Impression Count parameter 292.) An element of system integration for the media player 50 can be a callback event for the skip-element 56 so the publisher server 20' can detect when an ad stream 160 being streamed to a user device 10' is being skipped. In this manner, an ad skip event can be recorded and reported in an appropriate manner. The reporting may include the time interval from the time 165 when the skip-element was enabled to the skip event. In addition to reporting characteristics of the ad skip event, the position (order among a set of previously scheduled ad streams) of the ad stream 160 within the stopset 146 can also be reported. A rejection indication includes an instruction to skip the presentation of the ad stream (as received from an audience member via a skip-element 56 presented in association with an ad stream presentation,) and a duration of the presentation of the ad stream prior to the receiving of the rejection indication.

A "Click Count" parameter 296 records a number of click events detected by the systems 100, 100' via a companion-element 54. The click events correspond to detections of interest indications. Values of the Click Count parameter 296 can be 0, 1, . . . (smaller than or equal to the value of the Impression Count parameter 292.) The hub computer system 30' is configured to monitor impressions of the ad streams 160 across a monitored audience, and to detect indications of action taken by audience members in response to the respective calls-to-action 57 of the presented ad streams 160. The information included in a detected action indication can include evidence of an audience member 10, 10' having clicked on the companion-element 54 of an ad stream 160.

Further, the information can contain an indication of the audience member 10 having acquired a product described in the ad stream 160. Furthermore, the information included in the detected action indication can include one or more of (i) a publisher ID, an audience member ID, and a client computer ID; (ii) a time of day, a day of a week, and a month of the streaming of the ad stream; and (iii) a type of programming associated with the media stream switched by the ad stream. For example, the type of programming includes a genre of music of a radio stream, and a talk show or a documentary for a TV stream, etc. In addition, a time within the ad stream 160 when the click event was detected can also be recorded.

Data collected in the form of feedback parameters (Impression Count 292, Skip Count 294, and Click Count 296) during presentations of a skippable ad stream 160 corresponds to the detected "skip" (rejection), "no skip" (impression), and "click" (interest) events. A "skip" data point may indicate an audience member's negative reaction (e.g., annoyance) to the message delivered by the presented ad stream 160. The "skip" data point is exclusive to the "no skip" and "click" data points.

A "no skip" data point may indicate the audience member's neutral reaction (e.g., disinterest, indifference, and the like) to the message delivered by the presented ad stream 160. The "no skip" data point is exclusive to the "skip" data point, but may or may not be accompanied by a "click" data point.

The "click" data point may indicate the audience member's positive reaction (e.g., interest, curiosity, and the like) to the message delivered by the presented ad stream 160. The "click" data point is exclusive to the "skip" data point, and is always accompanied by the "no skip" data point.

The above data points collected from broad audiences can be analyzed to determine, for example, whether a given audience member 10, 10' skipped a particular ad stream 160 because she was not interested in the ad, or because she always skips a skippable ad stream 160, or because she was already familiar with the advertised product (possibly she had previously clicked on the companion-element 54 associated with the ad stream 160). Further, the analyzed data can be used to determine whether a certain audience member 10, 10' did not skip a specific ad stream 160 because he was interested in the ad, or he never skips because he is simply too lazy to skip, or whether he was unaware of a skip option (e.g., unaware of a presented skip-element 56). Furthermore, the collected data can be further analyzed to establish the predetermined time interval (and the value of the Skip Minimum variable 184) for playing an ad stream 160 prior to activating the skip-element 56. As described above in connection with FIG. 1C, the Skip Minimum variable 184 sets the length of the "grabber" portion 162 of the ad stream 160 and can be specified as a duration (in seconds) or a fraction (in percentage) of the ad stream 160. For example, analysis of patterns of audience behavior can identify a tendency of audiences to skip 30-s ad streams after an average presentation of 10 s.

Another parameter called "Skip Pattern" 298 can be recorded to capture the audience member's pattern for skipping ad streams 160. The Skip Pattern parameter 298 may help establish whether an audience member 10, 10' skips all ads, never skips, or selectively skips, always skips at the same point of an ad stream 160, and so on. The analyzed data can serve as feedback to the advertiser. Reports can be provided to show the advertiser which ad streams 160 are being skipped and at what point (in time the ad stream 160 was skipped.)

The techniques and systems disclosed in this specification further can be used to determine an average time after which a particular ad stream 160 is being skipped. Such average skip time can be added to a profile of the particular ad stream 160 and can be used for scheduling further personalized presentations of the particular ad stream 160. In some implementations, updating 250 the ad stream profile includes aggregating information included in the received rejection indication with information relating to previous presentations of the ad stream 160 by a plurality of publishers 20, 20' to an audience monitored by a hub computer system 30, 30'. Additionally, updating 250 the ad stream profile can include aggregating information included in the received rejection indication with information relating to previous presentations of the ad stream 160 by a publisher 20, 20' to an audience of the publisher monitored by the hub computer system 30, 30'.

Additionally, behaviors and patterns can be identified for each audience member 10, 10', for categories of audiences, or for a general audience. For example, it may be identified that some listeners skip all ad stream, and others never skip, while a number of listeners skip ad streams based on lack of interest in the message delivered by the ad stream. Such analysis can be added to and/or updated for an audience member's profile. In some implementations, updating 270 the audience member profile includes aggregating information included in the received rejection indication with information relating to previous ad stream presentations to the audience member by a plurality of publishers 20, 20' monitored by a hub computer system 30, 30'. Additionally, updating 270 the audience member profile can include aggregating information included in the received rejection indication with information relating to previous ad stream presentations to the audience member by a publisher 20, 20' monitored by the hub computer system 30, 30'.

Using ad stream profiles and/or audience member profiles, advertisers may determine whether listeners are willing to hear long skippable ad streams 160 (e.g., 30 s) during online radio streaming. Additionally, such determination may motivate playlist-based online radio stations 20, 20' to insert ad streams 160 longer that the usually played (10 s) ads.

Figure 3A:
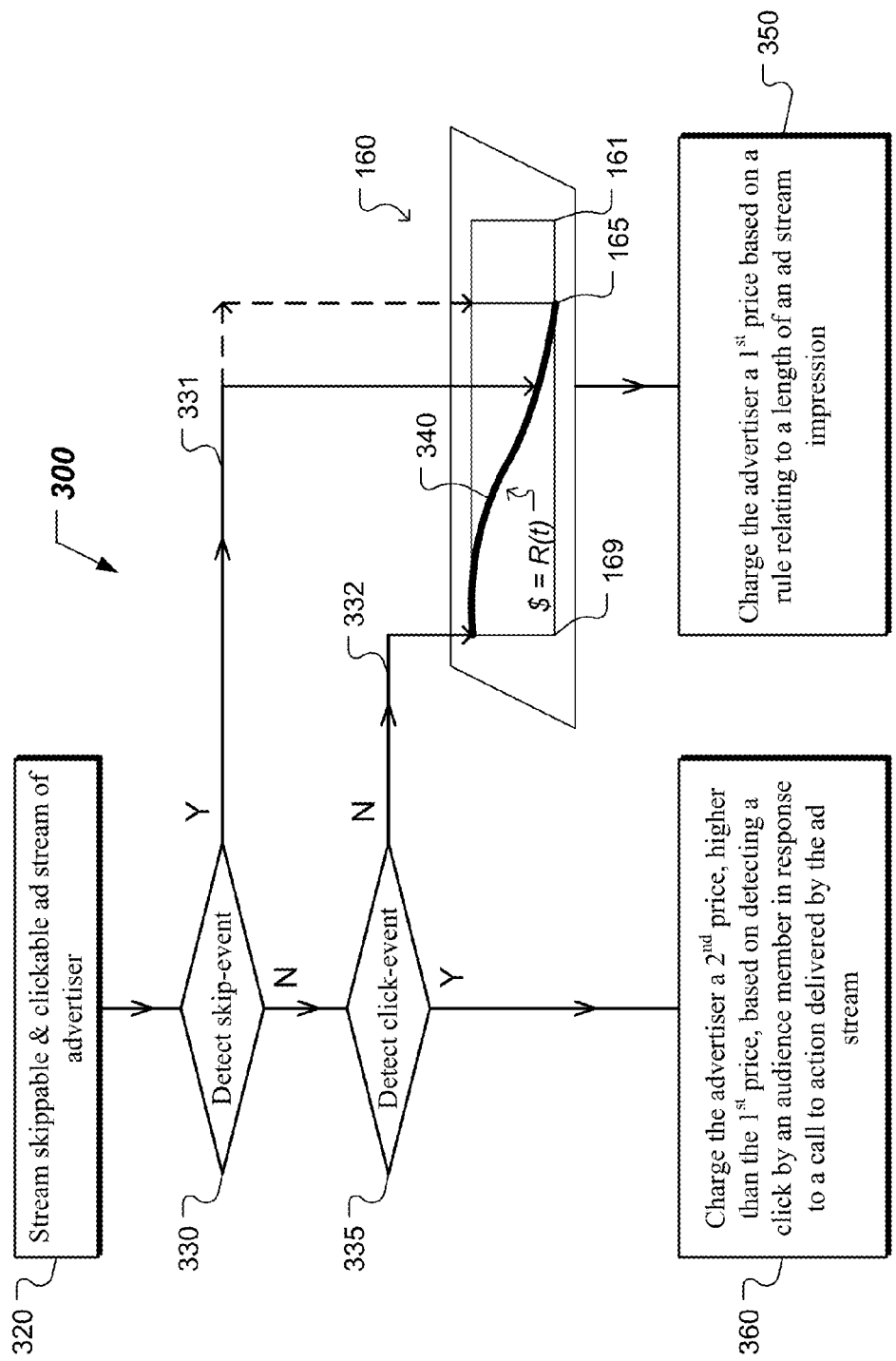
FIGS. 3A and 3B show a flow chart of an example process for charging an advertiser for presentation of an ad stream to an audience member.

FIG. 3A shows a flow chart of an example process for charging an advertiser for presentation of an ad stream to an audience member. Process 300 can be implemented, for example, on the plurality of computer systems 20, 30 of system 100, and/or on the plurality of computer systems 20', 30' of system 100'. Additionally, process 300 can be integrated with process 200 disclosed above in connection with FIG. 2A.

Process 300 includes streaming 320 an ad stream that is skippable and clickable as defined above. For example, a skip-element 56 and a companion-element 54 can be presented by a hub computer system 30' while streaming 320 the ad stream.

Process 300 continues by detecting a skip-event 330. If a skip-event is detected, process 300 continues along branch 331 by determining 340 a first price for a partial impression of the ad stream based on a rule, R(t), relating the first price to a length of the partial impression. A graphical representation of rule R(t) is illustrated in FIG. 3A by a thick continuous curve. Example implementations of the rule R(t) are described in connection with FIG. 3B. A maximum first price equals a predetermined price for a full impression of the ad stream. Determining 340 the first price can be performed upon receiving the rejection indication via the skip-element 56. The first price can be referred to as a Price per View (PPV) or Cost per View (CPV). As described in this specification, a CPV cost-model is similar to a CPM cost-model since an advertiser can be charged even if no audience activity is detected. Additionally, the CPV cost-model has similarities with a cost-per-click (CPC) cost-model since the advertiser can be charged for an effective event of "not skipping" by a certain point in a presentation of an audio/video ad stream.

Returning to the flow chart of process 300 illustrated in FIG. 3A, if a skip-event is not detected, process 300 continues by detecting a click-event 335. If a click-event is not detected, process 300 continues along branch 332 by setting 340 a first price equal to the predetermined price for a full impression of the ad stream. Process 300 further includes charging 350 an advertiser the first price for the (partial or full) impression of the ad stream.

If a click-event is detected, process 300 continues by charging 360 the advertiser a second price, higher than the predetermined price, upon receiving via the companion-element 54 an indication relating to interest in the ad stream presentation.

Figure 3B:
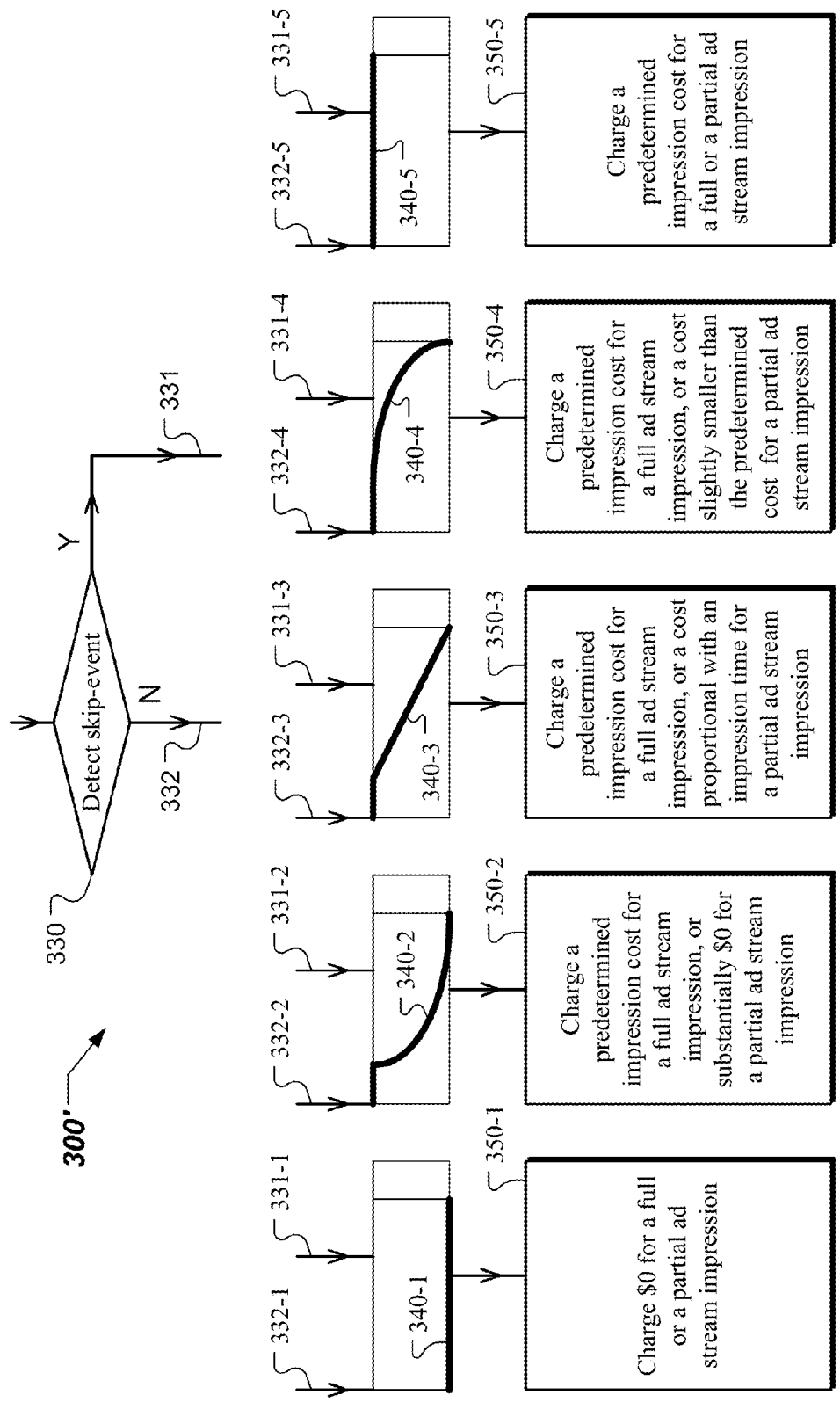

FIG. 3B shows a flow chart of another example process for charging an advertiser for presentation of an ad stream to an audience member. Process 300' can be integrated with process 300 disclosed above in connection with FIG. 3A. Detecting the skip-event 330 can be a true result that determines process 300' to continue along branch 331 to determining 340 the first price for a partial impression of the add stream. The determination is based on a rule relating the first price to a length of the partial impression. The first price may be equal to or smaller than a predetermined price for a full impression of the ad stream. Alternatively, detecting the skip-event 330 can be a false result that determines process 300' to continue along branch 332 to setting 340 the first price equal to the predetermined price for a full impression of the ad stream.

The rule for determining 340-5 the first price corresponding to the partial impression of the ad stream can set the first price equal to the predetermined price for a full impression of the second media stream. Consequently, process 300' may include charging 350-5 the predetermined cost for a full or a partial impression of the ad stream.

The rule for determining 340-1 the first price corresponding to the partial impression of the ad stream can set the first price and the predetermined price for a full impression equal to $0. Consequently, process 300' may include charging 350-1 $0 for a full or a partial impression of the ad stream.

The rule for determining 340-2 the first price corresponding to the partial impression of the ad stream can set the first price to values that are substantially $0 and are much less than the predetermined price for a full impression of the second media stream. Consequently, process 300' may include charging 350-2 the predetermined price for a full impression of the ad stream or substantially $0 for a partial impression of the ad stream. In this example, a first price that is substantially $0 means that the first price is much less ($\ll$) than the predetermined price (e.g., (predetermined price)=$10^{n}$*(first price), where the exponent "n" may be 1 or 2 or 3 . . . ).

The rule for determining 340-3 the first price corresponding to the partial impression of the ad stream can set the first price to a value that is proportional with a partial impression time of the second media stream. For example, the first price would be $0 if the ad stream 160 is skipped at the time 165 when the skip-element 56 is activated. The first price would a value between $0 and the predetermined price for a full impression of the second media stream after time 165. Consequently, process 300' may include charging 350-3 the predetermined price for a full impression of the ad stream or a price proportional with a partial impression time for a partial ad stream impression.

The rule for determining 340-4 the first price corresponding to the partial impression of the ad stream can set the first price to values that are slightly less than the predetermined price for a full impression of the second media stream. Consequently, process 300' may include charging 350-4 the predetermined price for a full impression of the ad stream or slightly less than the predetermined price for a partial ad stream impression. In this example, a first price that is slightly less than the predetermined price means that a relative difference between the predetermined price and the first price is much less ($\ll$) than 1. (E.g., [(predetermined price)−(first price)]/(predetermined price)=$10^{-n}$, where the exponent "−n" may be 1 or 2 or 3 . . . ).

A skippable ad stream 160 of an ad campaign can participate in an auction for insertion in available ad slot inventory 146. Once skipped, cost-per-click (CPC)-type skippable ad streams 160 can be treated for cost purposes as CPC-type non-skippable ad streams that have not been clicked, as described above in reference with branch 332 of processes 300, 330'. A skipped ad cannot be clicked, so there may be no cost to the advertiser, as described above in reference with rule 340-1 of process 330'. However, an impression of a CPM-type skippable ad stream 160 may be counted, whether or not an audience member skipped the skippable ad stream 160. Moreover, the counted impression of a skipped ad stream 160 can negatively affect the predicted CTR (pCTR) of the ad stream 160, as no click-through is expected after a skip event was recorded, as described above in reference with branch 331 of processes 300, 330'. Further, for CPM-type ad streams 160, multiple pricing options are available, as described above in reference with rules 340-2, 340-3, 340-4 and 340-5 of process 330'.

Additionally, the information collected in relation to skipping or not skipping ad streams 160 can be used to generate various dashboards and reports for monitoring the skipped ad streams, for instance.

Figure 4A:
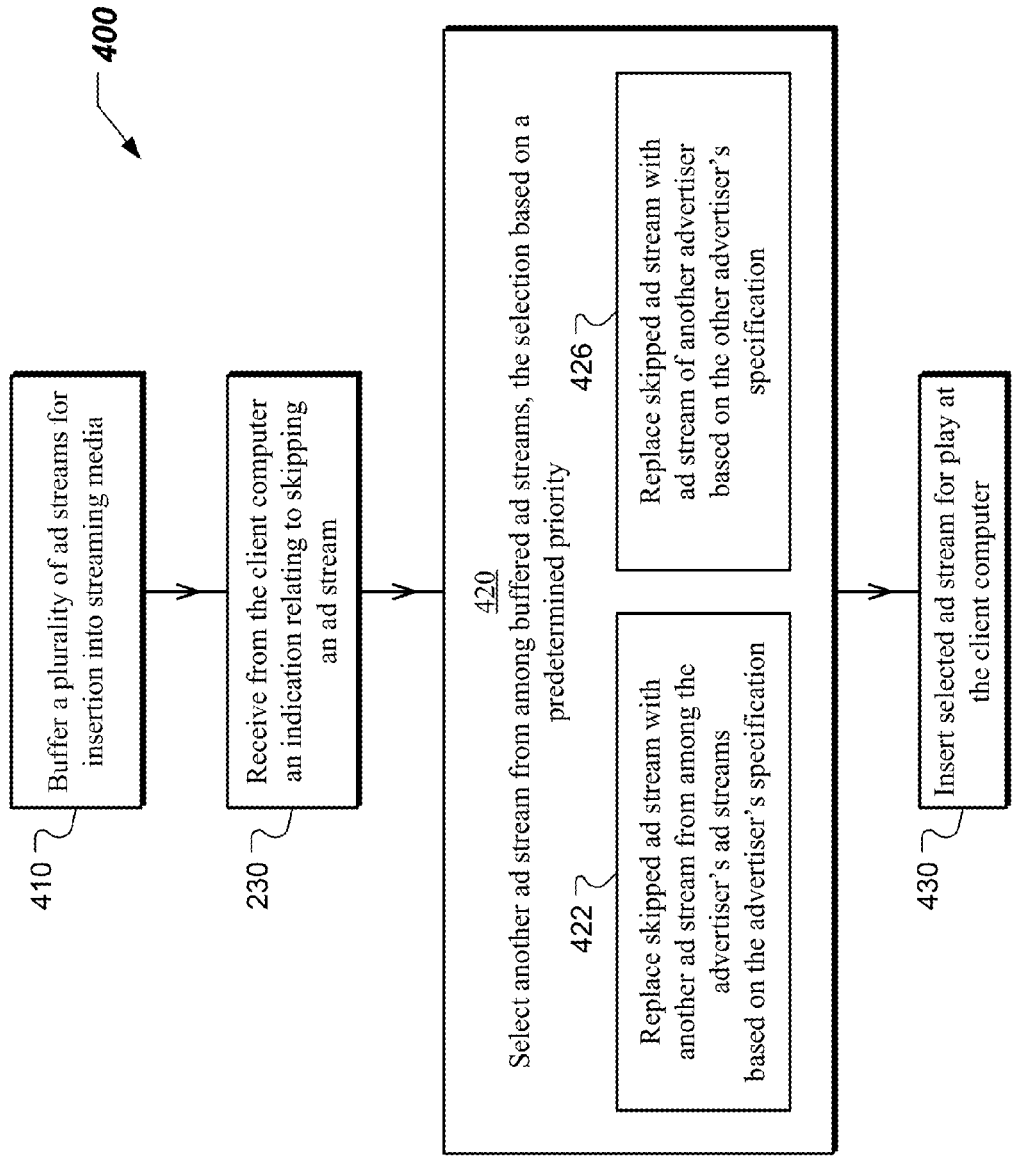
FIGS. 4A and 4B show flow charts of example processes for replacing an ad stream rejected by an audience member.

FIG. 4A shows a flow chart of an example process for replacing an ad stream rejected by an audience member. Process 400 can be implemented, for example, on the plurality of computer systems 20, 30 of system 100, and/or on the plurality of computer systems 20', 30' of system 100'. Additionally, process 400 can be integrated with process 200 disclosed above in connection with FIG. 2A.

Process 400 includes buffering 410 a plurality of ad streams 160 for insertion into the streaming media stream 140. In some implementations, the plurality of ad streams can be buffered at the media streaming computer system 20, 20'. For example, to address extra time occurring in a stopset 146 after a skip event is detected, the publisher 20, 20' may have to cache (e.g., add or remove) an audio buffer for re-filling the stopset 146. In other implementations, the plurality of ad streams can be buffered at the hub computer system 30, 30'. In some other implementations, the plurality of ad streams can be buffered at the user device 10, 10'. The buffered plurality of ad streams is for switching 220 from the currently streaming media stream 140 to streaming an ad stream to the user device 10, 10'.

Responsive to receiving 230 an indication of a rejection of the presentation of an ad stream, and prior to resuming 240 the streaming of the media stream 140 to the user device 10, 10', process 400 includes selecting 420 another ad stream from the buffered plurality of ad streams. The selection 420 can be based on a predetermined priority.

A rejected ad stream can be associated with a first advertiser. In some implementations, the predetermined priority can include replacing 422 the rejected ad stream with another ad stream associated with the first advertiser from the buffered plurality of ad streams. Replacing 422 the rejected ad stream may be based on a specification provided by the first advertiser. In one aspect, the received specification may include replacing the rejected ad stream with another of the first advertiser's ad stream that is related to the rejected type of product or service. In another aspect, the received specification may include replacing the rejected ad stream with another of the first advertiser's ad stream unrelated to the rejected type of product or service. In yet another aspect, the received specification may include replacing the rejected ad stream with another ad stream chosen randomly from among the first advertiser's ad streams.

In other implementations, the predetermined priority can include replacing 426 the rejected ad stream with another ad stream associated with a second advertiser from the buffered plurality of ad streams. Replacing 426 the rejected ad stream may be based on a specification provided by the second advertiser. In one aspect, the received specification may include replacing the rejected first advertiser's ad stream with a second advertiser's ad stream that is related to the first advertiser's rejected type of product or service. In another aspect, the received specification may include replacing the rejected first advertiser's ad stream with a second advertiser's ad stream that is unrelated to the first advertiser's rejected type of product or service. In yet another aspect, the received specification may include replacing the rejected first advertiser's ad stream with a second advertiser's ad stream chosen randomly from among the second advertiser's ad streams.

In some other implementation, the predetermined priority can include replacing a rejected media stream with another media stream from the buffered plurality of ad streams. Replacing the rejected ad stream may be based on a profile of the audience member associated with the user device 10, 10'.

Process 400 can continue by switching 430 from streaming the ad stream to streaming the other ad stream to the user device 10, 10'. Streaming the media stream 140 can be resumed 240 after streaming the other ad stream.

Figure 4B:
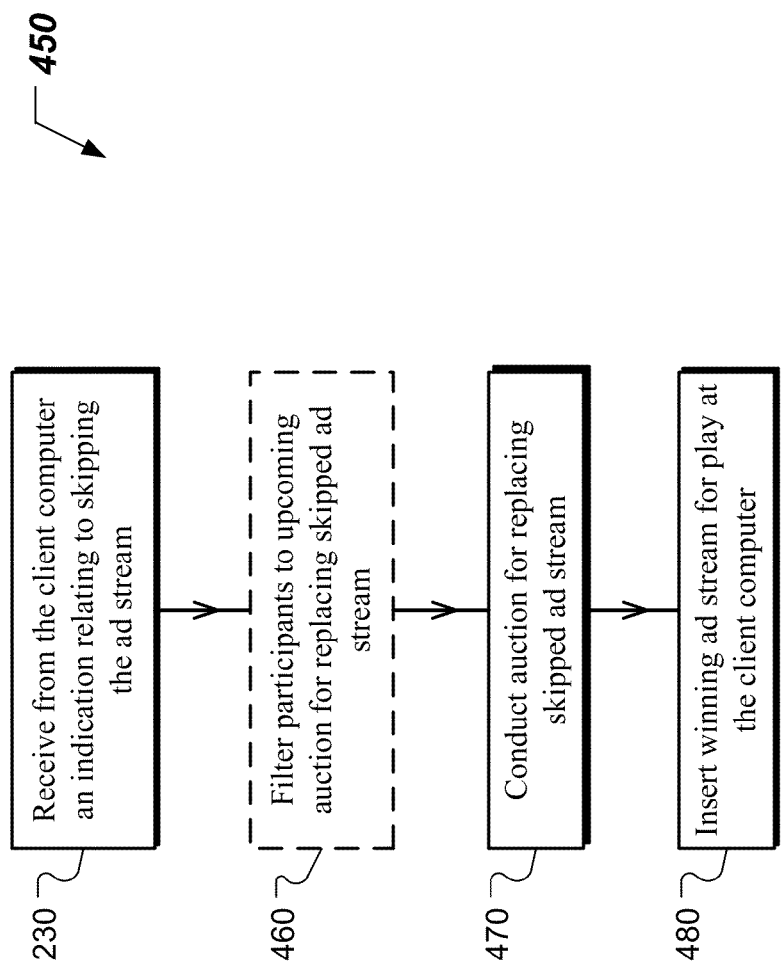

FIG. 4B shows a flow chart of another example process for replacing an ad stream rejected by an audience member. Process 450 can be implemented, for example, on the plurality of computer systems 20, 30 of system 100, and/or on the plurality of computer systems 20', 30' of system 100'. Additionally, process 450 can be integrated with process 200 disclosed above in connection with FIG. 2A.

Responsive to receiving 230 an indication of the rejection of a presentation of the ad stream 160, and prior to resuming 240 the streaming of the media stream 140 to the client computer 10, 10', process 450 includes conducting 470 an auction for replacing the rejected ad stream 160. Prior to conducting 470 the auction, process 450 may optionally include filtering 460 ad streams participating in the auction. The filter 460 may be based on a given criterion. In one aspect, the given criterion may include restricting participation to the upcoming auction of the advertiser associated with the rejected ad stream 160. In another aspect, the given criterion may include restricting participation to the upcoming auction of ad streams that are related to a type of product or service promoted by the rejected ad stream. In yet another aspect, the given criterion may include restricting participation to the upcoming auction of ad streams that are unrelated to a type of product or service promoted by the rejected ad stream.

Once the winner of the auction 470 has been identified, process 450 can continue by switching 480 from streaming the ad stream to streaming the identified other ad stream to the client computer 10, 10'. Streaming the media stream 140 can be resumed 240 after the presentation of the other ad stream.

Additionally, the analyzed data recorded in table 290 can serve as signals for selecting the most effective ads by the Internet-based provider of advertising services 30, 30'. The selection 420 can be from among buffered ad streams as disclosed in connection with process 400. Alternatively, the selection can represent filtering 460 ad streams prior to participation in an auction as disclosed in connection with process 450.

For example, a new predictive ad skip rate (pASR, in analogy to the pCTR) can be calculated based on the processes disclosed in this specification. In addition, the pASR can be continuously updated, and the updated pASR may be added to the ad stream selection process (420 or 460) for scheduling ad streams 160 with lowest pASRs. For skippable ad streams of CPM-type, the pASR may be used in conjunction with a CPM-bid. For example, publishers 20, 20' may charge a high CPM to advertisers that have ad streams which are often skipped by audiences. For skippable ad streams of CPC-type, the pASR may be used in conjunction with the pCTR to determine most effective ad streams 160. The analyzed data can be further used to determine a correlation between an ad skip rate and CTR.

Figure 5:
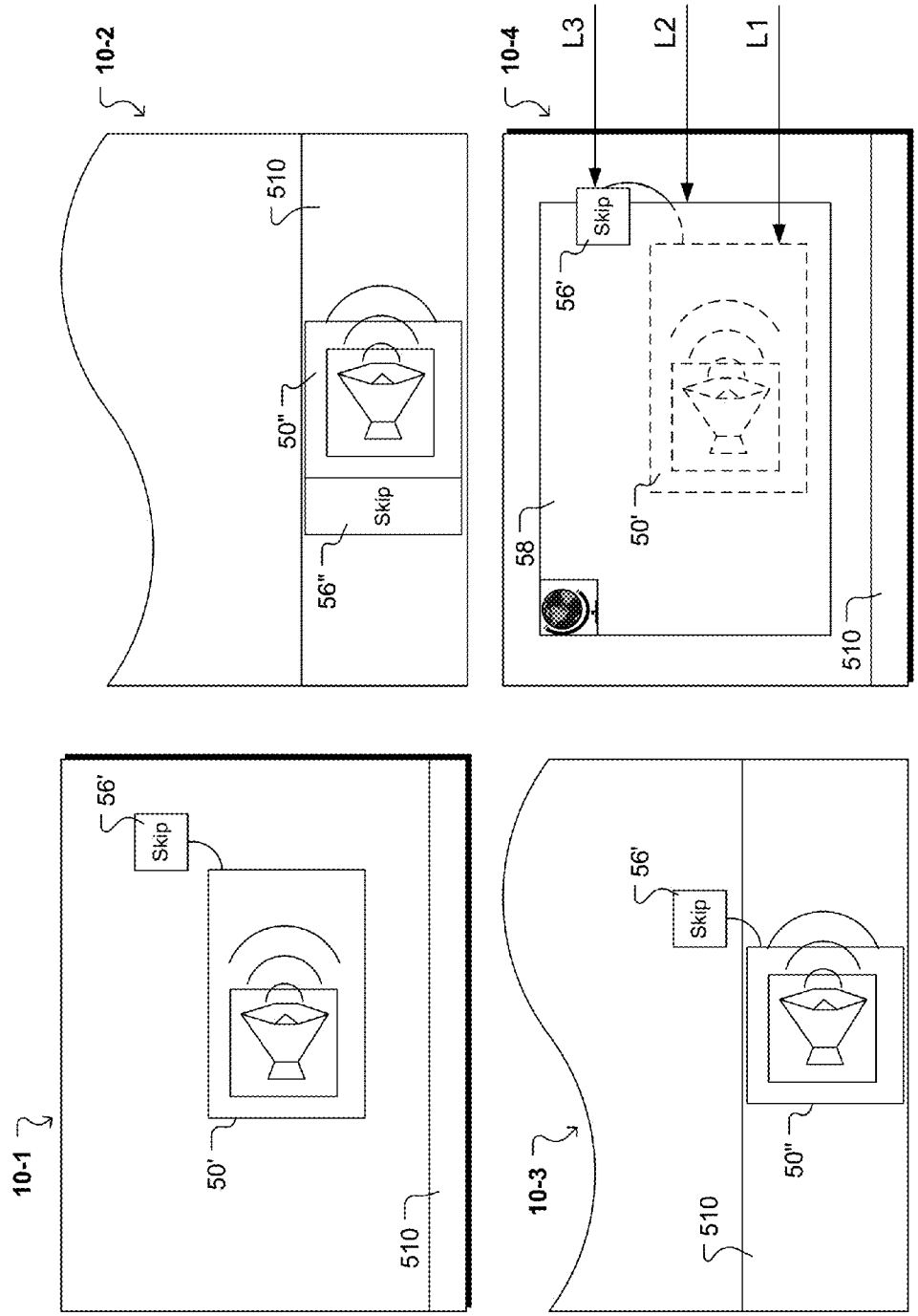
FIG. 5 shows example implementations of a skip-element presented to an audience member for rejecting an ad stream.

Returning to FIG. 1A, the desktop of client computer 10 includes a full-size instance of the media player 50. In this example implementation of system 100, an overlaid instance of skip-element 56 is presented to an audience member for rejecting a presentation of an ad stream. FIG. 5 shows other example instances of the skip-element 56. As listeners of audio streams may have the media player 50 minimized during content play, a representation of the skip-element 56 (e.g., button) may be visible whether the media player is minimized or not. For example, a representation of the skip-element 56 may be tethered to the minimized instance of the media player 50. Also, the same or another representation of the skip-element 56 may be attached to the toolbar (or menu list) of the media player 50 in the normal (non-minimized) instance of the media player.

FIG. 5 illustrates multiple instances of a desktop of client computer 10. Each instance of the desktop contains at least a portion of a task bar 510. Each of the different instances of the desktop 10-1, 10-2, 10-3 and 10-4 includes one of two instances of media player 50. Both a small-size instance of the media player 50' and a minimized-size instance of the media player 50" correspond to the full-size instance of the media player 50 illustrated in FIG. 1A.

Desktop instance 10-1 contains a small-size instance of the media player 50' that is rendered separately from the task bar 510. A tethered instance of the skip-element 56' corresponding to the media player 50' can be presented to an audience member associated with the desktop instance 10-1 in the same presentation layer as the media player 50'. Desktop instance 10-2 contains a minimized instance of the media player 50" that is rendered overlaid on the task bar 510. An overlaid instance of the skip-element 56" corresponding to media player 50" can be presented to an audience member associated with the desktop instance 10-2 in the same presentation layer as the media player 50". Desktop instance 10-3 contains the minimized instance of the media player 50" that is rendered overlaid on the task bar 510. The tethered instance of the skip-element 56' corresponding to the media player 50" can be presented to an audience member associated with the desktop instance 10-3 in the same presentation layer as the media player 50".

Desktop instance 10-4 contains the small-size instance of the media player 50' that is not rendered on the task bar 510. Moreover, the media player 50' playing an ad stream 160 can be hidden behind another application 58 running during the presentation of the ad stream 160. The tethered instance of the skip-element 56' corresponding to the hidden media player 50' can be presented to an audience member associated with the desktop instance 10-4 in a top-most presentation-layer L3 above presentation-layers L2 and L1 corresponding respectively to the application 58 and the media player 50'. Accordingly, the skip-element 56' can be accessed by the audience member for skipping the presentation of an ad stream 160 even if the media player 50' playing the ad stream 160 is hidden (outside of the field of view of the audience member.)

To ensure a consistent audience experience and accurate reporting of information collected by the disclosed systems 100, 100', certain aspects of the techniques 200, 300, 400 and 450 disclosed in this specification may need to be implemented. In some implementations, the ad streams 160 inserted in available ad slots 146 of media streams 140 may have to be presented along with a skip-element 56. In that fashion, audience members 10, 10' can count on each ad stream 160 played by a publisher 20, 20' being presented along with a skip-element 56, thus eliminating the need for the audience members 10, 10' having to determine whether the ad stream 160 is skippable. Further, data analysis for extracting effectiveness information relating to ad stream insertion may be simplified if all inserted ad streams 160 are skippable.

A flash player 50 running in a browser 58 or another type of media player 50 can detect whether the inserted ad stream 160 is skippable and hence, a skip-element 56 may be presented upon playing a skippable ad stream 160. In some implementations, the skip-element 56 may include a skip button placed on the browser player 50 in the vicinity of the rendered ad stream 52. (As shown in FIG. 1A.) In some implementations, the skip-element 56 may include a flag tethered to a minimized instance 50" or to a full instance 50 of the browser player. (As shown in FIG. 5, instances 10-1, 10-3 and 10-4.) The tethered flag 56' can be presented in the same layer as the browser player. (As shown in FIG. 5, instances 10-1, 10-2 and 10-3.) The tethered flag 56' can also be presented in the top-most layer, such that the tethered flag 56' remains visible even if the browser player 50' is hidden behind the windows of other applications 58 running while the ad stream 160 plays. (As shown in FIG. 5, instance 10-4.) The skip-element 56 may also be attached (e.g., overlaid 56, 56", tethered 56', etc.) to the browser player icon 50" on the operating system task bar 510. (As shown in FIG. 5, instances 10-2 and 10-3.)

In some implementations, the skip-element 56 may also include a countdown to show when the skip-element 56 will become enabled (ready for receiving rejection indications from the audience member). In some implementations, the skip-element 56 may include the duration of the total ad stream 160, so the audience members can decide if they want to skip the ad stream 160.

Figure 6:
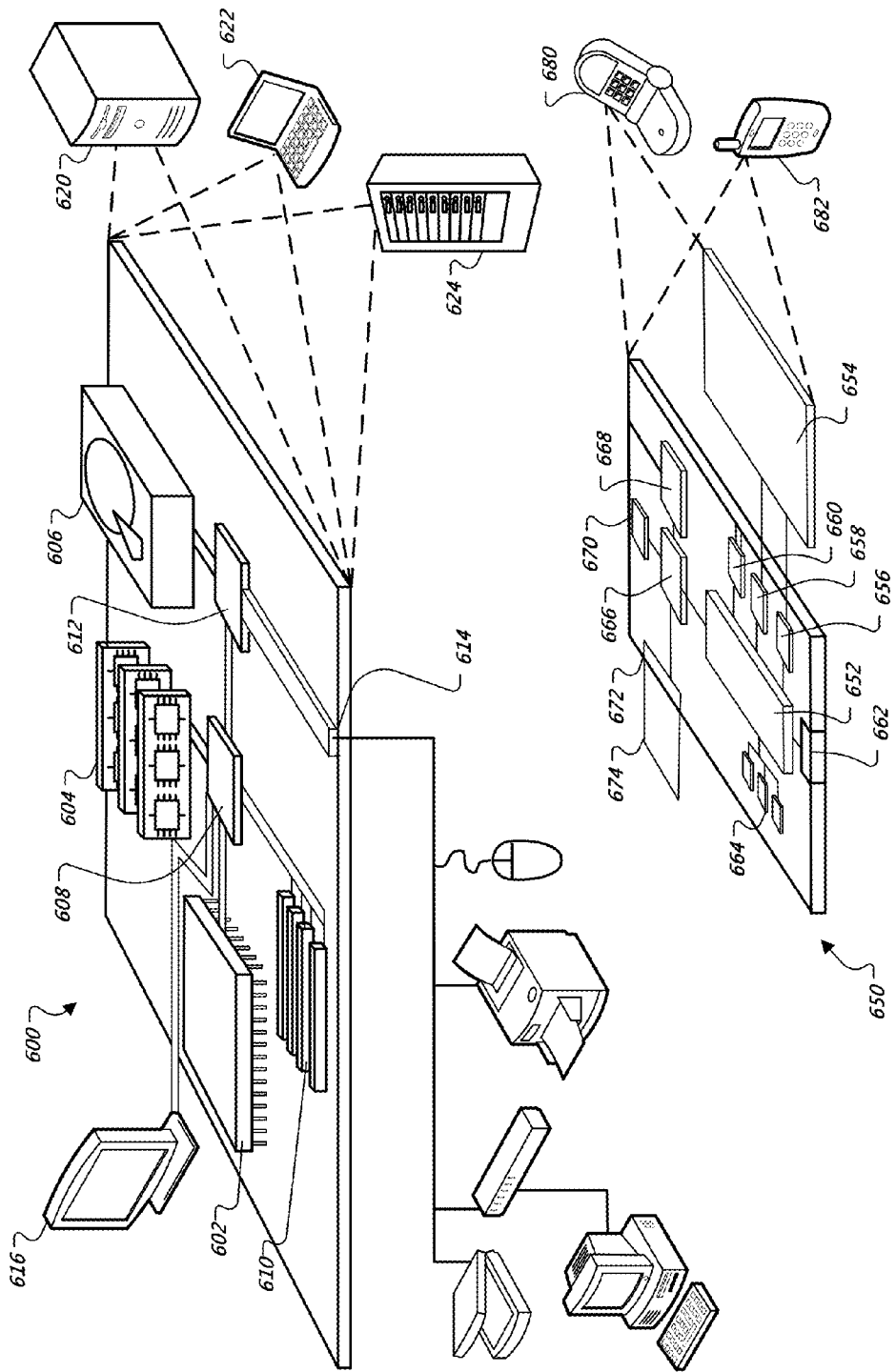
FIG. 6 is a block diagram of computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 606, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or a memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this document contains many specific implementation details, these should not be construed as limitations on the scope of any inventions or of what may be claimed, but rather as descriptions of features specific to particular implementations of particular inventions. Certain features that are described in this document in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method executed by a computer system, the method comprising:
   switching from streaming a first media stream to a client computer to streaming a second media stream to the client computer;
   instructing the client computer to tether a skip-element to an instance of a media player presenting the second media stream at the client computer; and
   instructing the client computer to render, concurrently with said switching to the second media stream, the tethered skip-element in a presentation-layer above one or more presentation-layers respectively corresponding to one or more applications running on the client computer during the presentation of the second media stream, wherein:
   the skip-element in the presentation layer remains visible when the one or more applications running on the client computer during the presentation of the second media stream at least partially visually occlude the media player instance, and
   the tethered skip-element, when selected by a user, switches, in the media player instance, from the presentation of the second media stream to presentation of the first media stream.

2. The method of claim 1, wherein rendering the tethered skip-element in the presentation-layer comprises presenting the tethered skip-element in an inactive state, and the method further comprises instructing the client computer to activate, after a predetermined time interval since said switching to the second media stream, the presented skip-element, wherein the skip-element, when activated, is configured to receive, from an audience member associated with the client computer, an indication relating to an audience rejection of the second media stream presentation.

3. The method of claim 2, wherein the predetermined time interval comprises a specified fraction of a total presentation time of the second media stream.

4. The method of claim 2, wherein the predetermined time interval comprises a duration of one or more advertisement slots.

5. The method of claim 2, further comprising:
   receiving an audience rejection indication relating to the second media stream from the client computer after the predetermined time interval has lapsed since switching from the first media stream to the second media stream; and
   in response to said receiving the audience rejection indication, interrupting streaming of the second media stream prior to completion of the second media stream and resuming streamlining of the first media stream to the client computer.

6. The method of claim 5, wherein the audience rejection indication comprises an instruction to skip the presentation of the second media stream and a duration of the presentation of the second media stream prior to the receiving of the audience rejection indication.

7. The method of claim 5, comprising:
   buffering a plurality of second media streams including the second media stream, wherein responsive to the received indication of the audience rejection of the presentation of the second media stream, and prior to said resuming the streaming of the first media stream to the client computer, the method further comprises:
   selecting a third media stream from the buffered plurality of media streams, said selecting the third media stream based on a predetermined priority; and
   switching from streaming the second media stream to streaming the selected third media stream to the client computer, wherein said streaming the first media stream is resumed after the presentation of the third media stream.

8. The method of claim 5, further comprising:
   aggregating information included in the received audience rejection indication with information relating to previous presentations of the second media stream by one or more publishers to an audience monitored by a hub computer system;
   updating an effectiveness profile of the second media stream based on the aggregated information; and
   scheduling future presentations of the second media stream based at least in part on the updated effectiveness profile of the second media stream.

9. The method of claim 1, further comprising:
   determining that a quantity of past audience rejection indications received from the client computer over a predetermined time period prior to said switching is less than a predetermined quantity, wherein the past audience rejection indications relate to rejections by an audience member associated with the client computer of past presentations of second media streams; and in response to said determining that the quantity of past audience rejection indications received from the client computer over the predetermined time period prior to said switching is less than the predetermined quantity, instructing the client computer to tether the skip-element to the instance of the media player presenting the second media stream.

10. The method of claim 1, wherein the first media stream comprises at least one of an online radio audio stream or a video stream and the second media stream comprises one of an audio advertisement or a video ad.

11. The method of claim 1, further comprising instructing the client computer to present a companion-element of the second media stream during said streaming of the second media stream, wherein the companion-element is configured to receive an indication relating to interest in the second media stream presentation, and is presented separately from the skip-element.

12. The method of claim 1, wherein the media player instance includes one of a full-screen instance, a minimized instance, or an instance occupying some but not all of the screen.

13. A non-transitory computer storage medium encoded with a computer program, the program comprising instructions that when executed by a data processing apparatus cause the data processing apparatus to perform operations comprising:

switching from streaming a first media stream to a client computer to streaming a second media stream to the client computer;

instructing the client computer to tether a skip-element to an instance of a media player presenting the second media stream at the client computer; and instructing the client computer to render, concurrently with said switching to the second media stream, the tethered skip-element in a presentation-layer above one or more presentation-layers respectively corresponding to one or more applications running on the client computer during the presentation of the second media stream, wherein:

the skip-element in the presentation layer remains visible when the one or more applications running on the client computer during the presentation of the second media stream at least partially visually occlude the media player instance, and the tethered skip-element, when selected by a user, switches, in the media player instance, from the presentation of the second media stream to presentation of the first media stream.

14. The computer storage medium of claim 13, wherein rendering the tethered skip-element in the presentation-layer comprises presenting the tethered skip-element in an inactive state, and the method further comprises instructing the client computer to activate, after a predetermined time interval since said switching to the second media stream, the presented skip-element, wherein the skip-element, when activated, is configured to receive, from an audience member associated with the client computer, an indication relating to an audience rejection of the second media stream presentation.

15. The computer storage medium of claim 14, the operations further comprising:

receiving an audience rejection indication relating to the second media stream from the client computer after the predetermined time interval has lapsed since switching from the first media stream to the second media stream; and in response to said receiving the audience rejection indication, interrupting streaming of the second media stream prior to completion of the second media stream and resuming streamlining of the first media stream to the client computer.

16. The computer storage medium of claim 15, the operations further comprising:

aggregating information included in the received audience rejection indication with information relating to previous presentations of the second media stream by one or more publishers to an audience monitored by a hub computer system;

updating an effectiveness profile of the second media stream based on the aggregated information; and scheduling future presentations of the second media stream based at least in part on the updated effectiveness profile of the second media stream.

17. The computer storage medium of claim 13, the operations further comprising:

determining that a quantity of past audience rejection indications received from the client computer over a predetermined time period prior to said switching is less than a predetermined quantity, wherein the past audience rejection indications relate to rejections by an audience member associated with the client computer of past presentations of media streams; and in response to said determining that the quantity of past audience rejection indications received from the client computer over the predetermined time period prior to said switching is less than the predetermined quantity, instructing the client computer to tether the skip-element to the instance of the media player presenting the media stream.

18. A system comprising:

one or more hardware processors; and one or more non-transitory computer-readable media encoding instructions that, when executed by the one or more hardware processors, cause the system to perform operations comprising: switching from streaming a first media stream to a client computer to streaming a second media stream to the client computer;

instructing the client computer to tether a skip-element to an instance of a media player presenting the second media stream at the client computer; and instructing the client computer to render, concurrently with said switching to the second media stream, the tethered skip-element in a presentation-layer above one or more presentation-layers respectively corresponding to one or more applications running on the client computer during the presentation of the second media stream, wherein:

the skip-element in the presentation layer remains visible when the one or more applications running on the client computer during the presentation of the second media stream at least partially visually occlude the media player instance, and the tethered skip-element, when selected by a user, switches, in the media player instance, from the presentation of the second media stream to presentation of the first media stream.

19. The system of claim 18, wherein rendering the tethered skip-element in the presentation-layer comprises presenting the tethered skip-element in an inactive state, and the method further comprises instructing the client computer to activate, after a predetermined time interval since said switching to the second media stream, the presented skip-element, wherein the skip-element, when activated, is configured to receive, from an audience member associated with the client computer, an indication relating to an audience rejection of the second media stream presentation.

20. The system of claim 19, the operations further comprising:
   receiving an audience rejection indication relating to the second media stream from the client computer after the predetermined time interval has lapsed since switching from the first media stream to the second media stream; and
   in response to said receiving the audience rejection indication, interrupting streaming of the second media stream prior to completion of the second media stream and resuming streamlining of the first media stream to the client computer.

21. The system of claim 20, the operations further comprising:
   aggregating information included in the received audience rejection indication with information relating to previous presentations of the second media stream by one or more publishers to an audience monitored by a hub computer system;
   updating an effectiveness profile of the second media stream based on the aggregated information; and
   scheduling future presentations of the second media stream based at least in part on the updated effectiveness profile of the second media stream.

* * * * *